United States Patent [19]
Sooudi et al.

[11] Patent Number: 6,161,722
[45] Date of Patent: Dec. 19, 2000

[54] LIQUID DISPENSING DEVICE AND METHODS UTILIZING A MAGNETICALLY COUPLED VALVE STEM

[75] Inventors: Sidney K. Sooudi, Alpharetta; Edward C. Taylor, Cumming, both of Ga.

[73] Assignee: Nordson Corporation, Westlake, Ohio

[21] Appl. No.: 09/182,151

[22] Filed: Oct. 29, 1998

[51] Int. Cl.[7] .................................................. G01F 11/00
[52] U.S. Cl. ................................. 222/1; 222/504; 251/65
[58] Field of Search ...................... 222/1, 504; 251/63.5, 251/63.4, 65

[56] References Cited

U.S. PATENT DOCUMENTS

| | | | |
|---|---|---|---|
| 4,274,444 | 6/1981 | Ruyak | 251/65 X |
| 4,940,207 | 7/1990 | Katsuyama | 251/65 |
| 5,484,133 | 1/1996 | Oliver | 251/65 X |

OTHER PUBLICATIONS

Bimba Manufacturing Company, *Bimba Ultrans Rodless Cylinder*, Catalog, pp. 2–6 and 8–9, 1996.

*Primary Examiner*—Joseph A. Kaufman
*Attorney, Agent, or Firm*—Wood, Herron & Evans, L.L.P.

[57] ABSTRACT

A liquid dispensing device including a body generally having an actuator cavity and a liquid passage. A valve seat element is connected to the body and a valve stem is mounted for movement within the body with respect to the valve seat element. Inner and outer magnetic elements are disposed around the periphery of the valve stem to couple the valve stem to the valve actuator. The inner magnetic element is connected to the valve stem for movement with the valve stem within the body. The outer magnetic element is connected with an actuator and is slidable within the body in response to, for example, pressurized air being applied against the actuator. The magnetic elements couple the valve stem to the actuator and eliminate the need for a dynamic seal between the valve stem and body.

21 Claims, 4 Drawing Sheets

LIQUID DISPENSING DEVICE AND METHODS UTILIZING A MAGNETICALLY COUPLED VALVE STEM

FIELD OF THE INVENTION

This invention generally relates to liquid dispensing devices used for a variety of purposes, but particularly useful for viscous liquids such as hot melt adhesives, sealing compounds, paints, etc. Such devices are referred to as fluid control valves or dispensing guns or modules.

BACKGROUND OF THE INVENTION

A typical dispensing device for supplying liquid, such as hot melt adhesive, generally includes a body having a valve stem that opens and closes a dispensing orifice. The valve stem is usually actuated in at least one direction by pressurized air to dispense discrete amounts of pressurized liquid. Either a spring mechanism or pressurized air is used to move the valve stem in an opposite direction against a valve seat. This stops the flow of liquid from the dispensing orifice.

More specifically, devices generally related to the present invention include a liquid passage adjacent the dispensing orifice and an actuator cavity or chamber at an opposite end of the device. The actuator cavity contains a portion of the valve stem which is connected with a piston member and which is also connected with a spring return mechanism, as discussed above. Under sufficient air pressure applied on one side of the piston member, the valve stem is moved in a direction away from the valve seat to discharge liquid. When the air pressure is relieved, the spring mechanism will automatically return the valve stem to a normally closed position against the valve seat. Such spring mechanisms generally include an adjustment to vary the spring compression and thereby vary the amount of air pressure required to open the valve. Adjustment of the spring compression will also adjust the biasing force used to close the valve. These devices also include a stroke adjustment, or the spring compression adjustment also varies the stroke of the valve stem to adjust the flow rate.

Despite the wide success of devices as described above, continuing problems exist. For example, a dynamic seal placed generally between the dispenser body and the moving valve stem typically prevents liquid from leaking into the actuator cavity. These dynamic seals press tightly against the valve stem and cause friction and seal wear. The higher friction places greater demands on the requirements for pressurized air to move the valve stem. Moreover, the valve typically hesitates as the pressurized air has to overcome high breakout friction. On the other hand, selecting a looser dynamic seal results in inadequate sealing, thus allowing the liquid to bind the piston and pressurized air to enter into the liquid passage, causing undesired dispensing discontinuities. Even with reduced friction, the dynamic seal will wear over time and lose its ability to seal properly.

It would therefore be desirable to provide a dispensing method and dispenser device that eliminates or reduces the need for dynamic seals in contact with the pressurized liquid, thus eliminating or reducing problems such as those mentioned above.

SUMMARY OF THE INVENTION

The present invention therefore generally provides a liquid dispensing device having a body with a liquid passage, and a valve stem having a needle tip portion mounted for movement within the liquid passage between open and closed positions relative to a valve seat. In accordance with the invention, a valve actuator is magnetically coupled to the valve stem across a barrier to move the valve stem between the open position and the closed position. The magnetic coupling eliminates the need for a dynamic liquid seal in engagement with the valve stem since the barrier performs as a static seal.

In accordance with the preferred embodiment of the invention, first and second magnetic elements are disposed around the valve stem to couple the valve stem to the valve actuator. The first magnetic element is an inner magnetic element connected to the valve stem for movement with the valve stem within the body. The second magnetic element is preferably an outer magnetic element connected to the valve actuator for movement with the valve actuator. The magnetic coupling, i.e., the magnetic attraction or repulsion forces between the inner and the outer magnetic elements, ensures that the valve stem moves with the valve actuator. The valve actuator is an air piston contained in an actuator cavity separated from the liquid passage by a static liquid seal, or barrier. The piston is moved in response to an external pressurized air input, such as pressurized air from a solenoid valve.

Although other forms of attractive or repulsive magnetic elements are contemplated within the scope of this invention, the magnetic element arrangement described above is preferred. The inner magnetic element is formed by a plurality of inner annular magnets separated by inner annular magnetically conductive spacers on an outer surface of the valve stem. The outer magnetic element is formed by a plurality of spaced outer annular magnets on an inner surface of a support separated by outer annular magnetically conductive spacers.

The valve stem is preferably formed from a nonmagnetic material, such as a nonmagnetic metal or polymer, and includes a magnet mounting portion having a first end with a cap and a second, threaded end. The threaded end preferably receives the inner annular magnetic element. The second threaded end of the magnet mounting portion is mated to a needle tip portion of the valve stem which interacts with the valve seat to control the flow of liquid from the dispensing orifice. The magnet mounting portion and inner magnetic element of the valve stem are encased within a nonmagnetic tubular member, which in turn is surrounded or circumscribed by the outer magnetic element. The tubular member has a plug to prevent the escape of the liquid from the tubular member to the exterior of the dispenser.

The outer magnetic element is mounted within an actuator cup that slidably engages a portion of the length of the nonmagnetic tubular member. The inner and outer magnetic elements are magnetically coupled so that movement of the outer magnetic element along the length of the tubular member causes a pulling movement or a repelling movement of the inner magnetic element within the tubular member. Movement of the outer magnetic element is preferably caused by pressurized air which moves the valve stem, as mentioned above, and a spring mechanism to return the valve stem to the closed position when the air pressure is reduced or turned off.

The outer annular magnetic elements and magnetically conductive spacers are alternately placed in the actuator cup so that the polarity of each successive magnetic element is reversed. Polymeric bearings are disposed at each end of the stacked outer magnetic element and spacer arrangement. In order to form a seal between the actuator cup and the interior of the body, the exterior of the actuator cup is threaded and a polymeric seal is placed over a circular projection and a nut is placed over the seal and tightened to retain the polymeric seal. The body includes a cylindrical actuator cavity to receive the actuator cup and, in a lower portion of the body, includes a cylindrical constriction to receive the tubular member. The tubular member is sealed to the body at the constriction using a static seal, separating the liquid passage from the actuator cavity. The static seal comprises one or a combination of the tubular member directly or indirectly engaging the constriction and/or a flexible seal placed between the tubular member and the constriction. The lower end of the tubular member communicates with the liquid inlet so that liquid may flow up the tubular member. The plug prevents liquid from escaping out the upper end of the tubular member and also prevents an excessive stroke length of the valve stem. The tubular member receives the inner magnetic element, magnet mounting portion and needle tip portion of the valve stem and these components therefore contact the liquid. With the liquid in contact with the needle tip portion and inner magnetic element, the sealed, magnetically-actuated valve stem module of the present invention is operable in excess of 2000 cycles per minute.

These and other objects, advantages and features of the invention will become more readily apparent to those of ordinary skill in the art upon review of the following detailed description of the preferred embodiment taken in conjunction with the accompanying drawings.

DETAILED DESCRIPTION OF THE PREFERRED EMBODIMENTS

Figure 1:
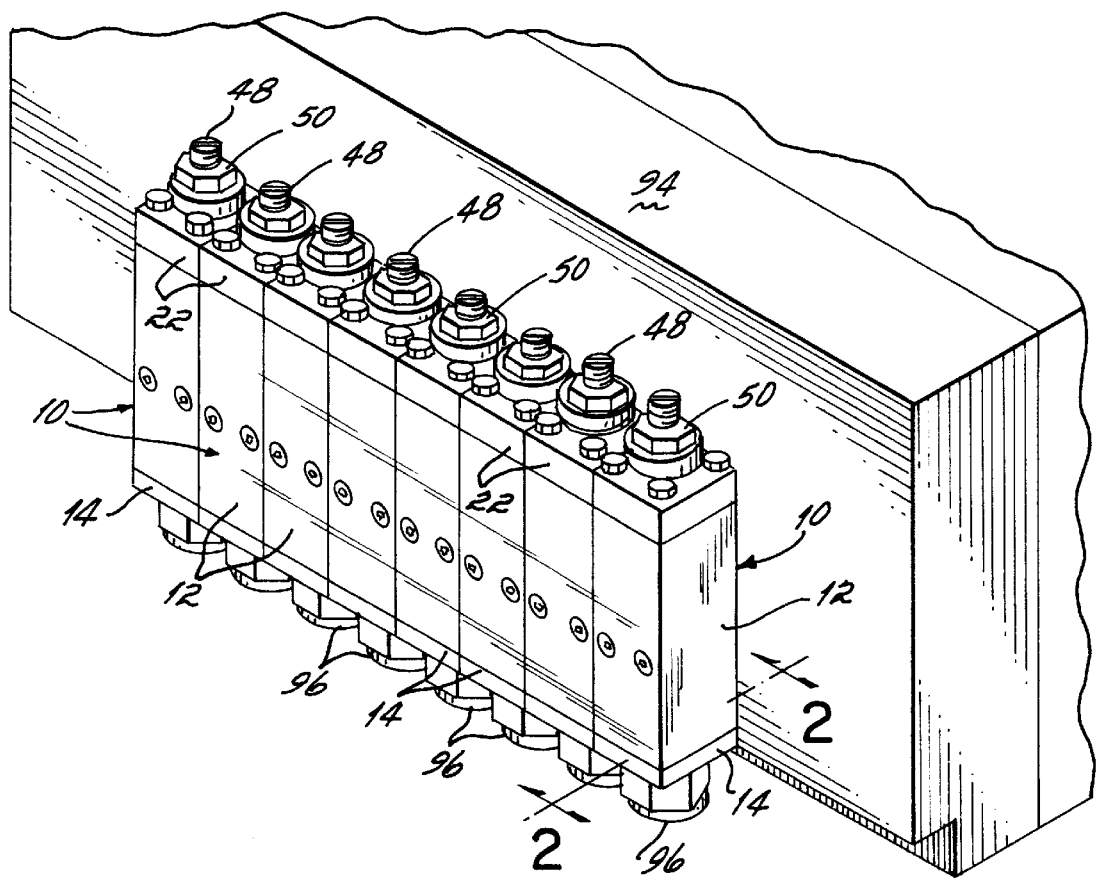
FIG. 1 is a perspective view of a plurality of dispensing devices constructed in accordance with a preferred embodiment of the present invention.
Figure 2:
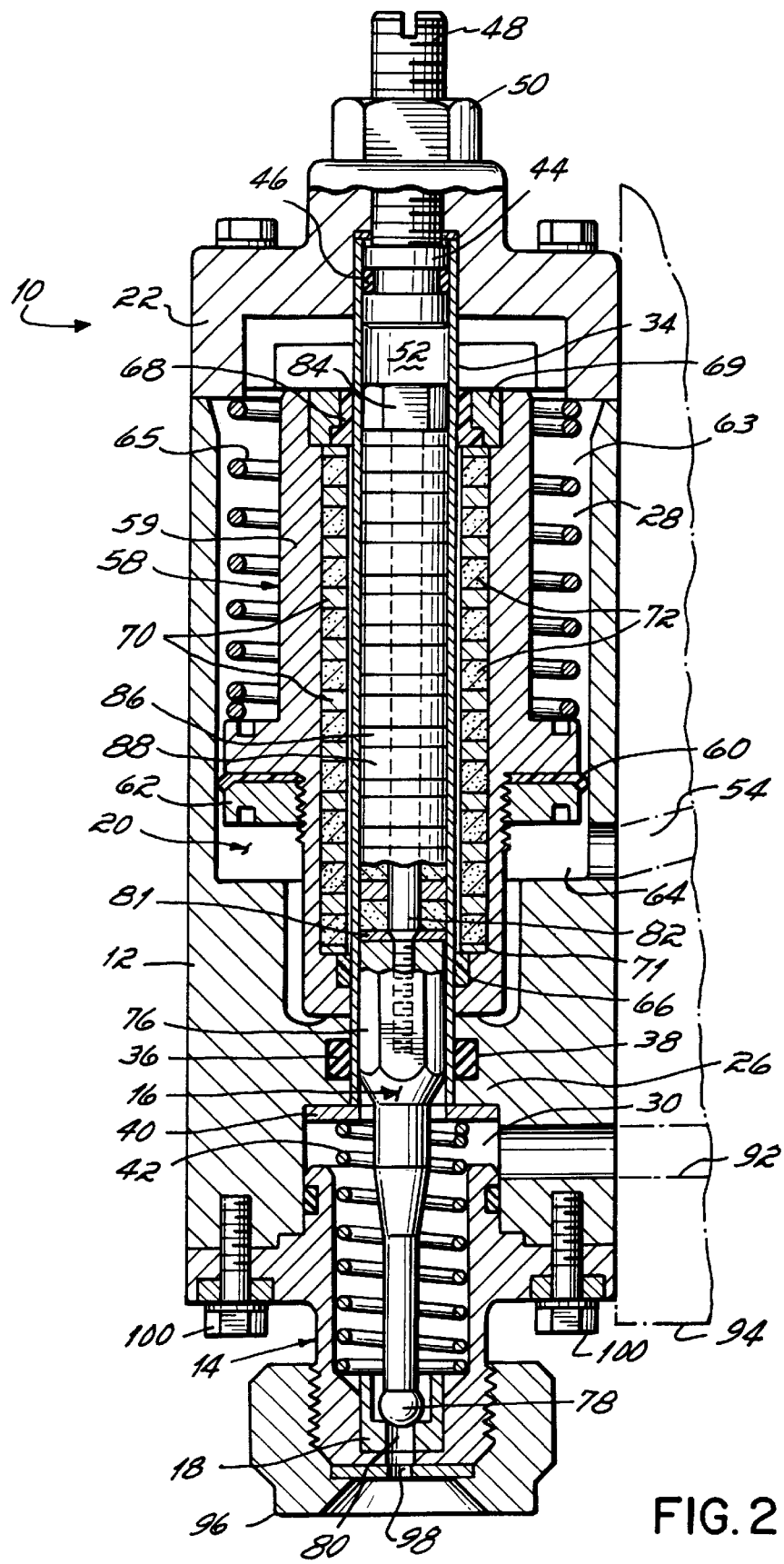
FIG. 2 is a cross-sectional view of the device shown in FIG. 1 in the closed position and taken generally along line 2—2 thereof.
Figure 3:
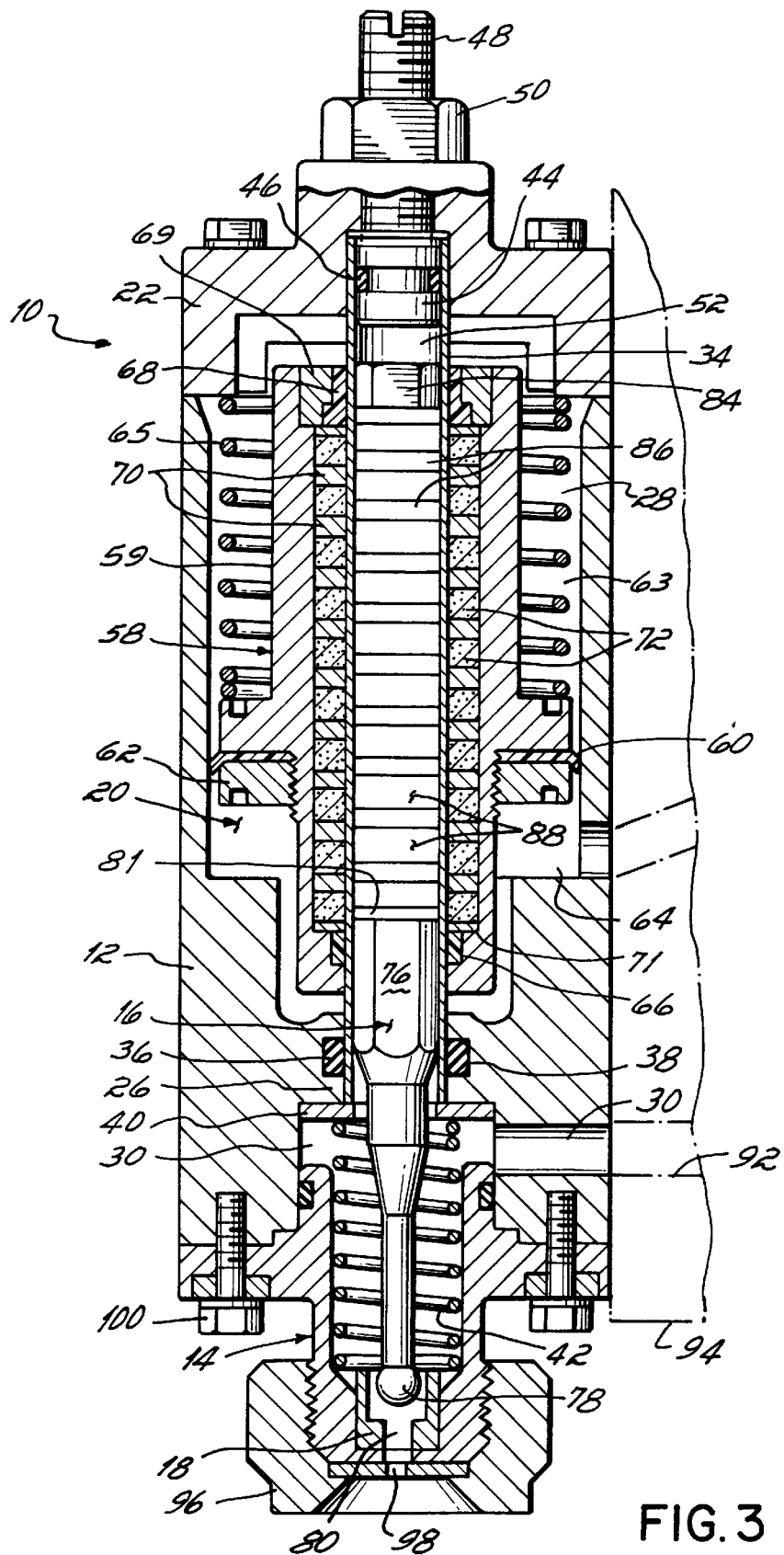
FIG. 3 is a cross-sectional view of the device similar to FIG. 2 showing the device transitioning to an open position.

Referring to FIGS. 1–3, the dispensing device 10 of the preferred embodiment includes a body 12, a valve seat 14, and a valve stem 16 mounted for reciprocating movement within body 12. Valve stem 16 forms a valve with valve seat 14. Body 12 is preferably formed from aluminum while valve seat 14 and valve stem 16 are preferably formed from nonmagnetic stainless steel. Seat 14 can include a seat insert 18 formed of a harder material, such as tool steel or carbide. As further shown in FIG. 2, body 12 of device 10 includes a longitudinal bore 20 which is sealed by an upper cap 22, preferably of nonmagnetic stainless steel, and by seat 14.

Longitudinal bore 20 has a constriction 26. The portion of the longitudinal bore 20 above the constriction 26 is an actuator cavity 28 and the portion below is a liquid passage 30. Within the longitudinal bore 20 is a cylindrical tubular member 34 extending from the upper cap 22, through the actuator cavity 28, and through the constriction 26 to the liquid passage 30. The preferred material for the tubular member 34 is nonmagnetic stainless steel.

The actuator cavity 28 is sealed from the liquid passage 30 primarily by having the tubular member 34 in substantial contact with the walls of the constriction 26. Additionally, a main static seal 36 is contained in a recess 38 in constriction 26 and peripherally contacts the tubular member 34 in a liquid-tight manner. Alternatively, the tubular member 34 could be molded or bonded to the constriction 26 such that the main static seal 36 is unnecessary.

Tubular member 34 is held longitudinally in place by the upper cap 22 and a washer 40 held in place by one end of a lower spring mechanism 42. The second end of the lower spring mechanism 42 primarily rests against a shoulder in the valve seat 14 in the distal end of the lower cap 24. The valve seat insert 18 is frictionally held within the valve seat 14. Alternatively, to enhance maintainability, the second end of the lower spring mechanism 42 may be operatively connected to the valve seat insert 18, such as through an intervening washer, to hold the insert 18 in position against the valve seat 14.

The washer 40 in combination with the lower spring mechanism 42 serves a protective function of yieldingly resisting the insertion of the tubular member 34 into the liquid passage 30 during assembly, preventing deformation of the tubular member 34. Such deformation could result in binding of the valve stem 16. This protective function is achieved by having the tubular member slidably engaged within the longitudinal bore 20 and thus able to extend further into the liquid passage 30 to avoid compression by the upper cap 22.

The upper end of tubular member 34 contains a plug 44 and seal 46 to prevent the escape of liquid through the tubular member 34. The position of plug 44 and seal 46 is adjustable by threaded rod 48 and lock nut 50 to adjustably control the stroke length of valve stem 16, and thereby setting a maximum position for the open position. FIG. 2 shows a valve stem space 52 between the plug 44 and the valve stem 16 when the valve stem 16 is in the closed position. This space 52 is reduced, as shown in FIG. 3, when the valve stem 16 is transitioning to the open position. The upper end of body 12 is generally defined to include an air entry port 54 communicating with the actuator cavity 28 which can be pressurized to force an actuator 58, comprising a piston assembly, upwardly as shown in FIG. 3.

The actuator 58 generally includes an actuator cup 59, a seal 60, typically formed from a rugged polymer such as glass impregnated PTFE discs (sold as Rulon type AR by Furon Company) and a locking ring 62 to maintain the position of seal 60. The seal 60 contacts the walls of the actuator cavity 28 defining an upper chamber 63 and a lower chamber 64. The actuator cup 59 is generally forced toward the lower end of body 12 by one end of an upper spring mechanism 65. The opposite end of spring mechanism 65 bears against the upper cap 22. The air pressure required to overcome the upper spring mechanism can be made adjustable by substituting springs of desired response or by including an element to lower the contact point between the upper cap 22 and the upper spring mechanism 65. In this latter regard, one or more washers may be placed between cap 22 and spring mechanism 65. The actuator cup 59 typically includes lower bearing 66 and upper bearing 68 which contact and move along the cylindrical tubular member 34. The upper bearing 68 is held in place within the actuator cup 59 by a pressfit member 69.

Referring to FIGS. 2 and 3, the valve stem 16 includes a needle tip portion 76 with a ball 78 at its extreme end, the ball 78 contacting the valve seat insert 18 and closing a dispensing orifice 80 when the valve stem 16 is in its closed position. The valve stem 16 also includes a magnet mounting portion 82 having its first end threadably attached to the needle tip portion 76 and having its second end widening into a cap 84.

Figure 4:
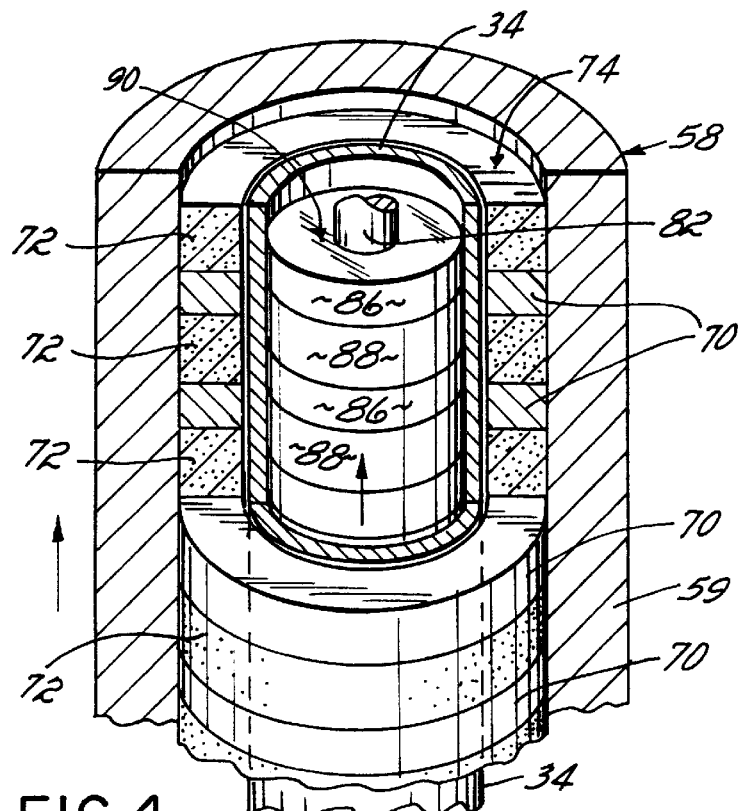
FIG. 4 is an enlarged sectional view of a portion of the device shown in FIG. 1.

Referring to FIG. 4, within the actuator cup 59 between the lower bearing 66 and upper bearing 68, outer iron spacers 70 and outer torric magnets 72 are alternately stacked, forming an outer magnetic element 74. The magnet mounting portion 82 holds alternately stacked inner iron spacers 86 and inner torric magnets 88, forming an inner magnetic element 90.

The gun 10 may operate at temperatures of up to 500° F. and, therefore, a magnet which maintains its strength to high temperatures is preferred. One such rare earth magnetic material is samarium cobalt. Two samarium cobalt compositions which are suitable are $Co_5Sm$ which is 66% by weight cobalt and 34% by weight samarium or $Co_{17}Sm_2$ which is 77% by weight cobalt and 23% by weight samarium. Other magnets may be used for both high and low temperature applications. Suitable materials for low temperature applications may include neodymium-iron-boron.

Figure 5:
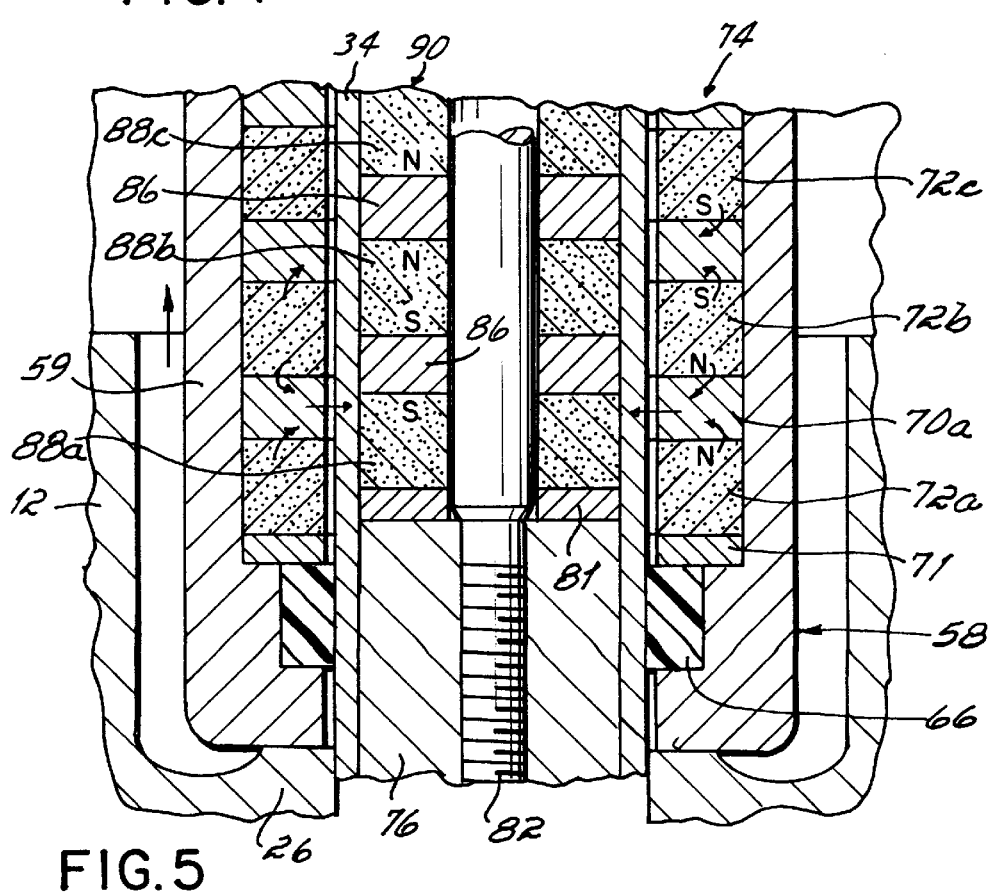
FIG. 5 is an enlarged sectional view of a portion of the device shown in FIG. 1.

As shown in detail in FIG. 5, a narrow spacer 71 is first placed in the actuator cup 59 over seal 66. Outer torric magnet 72a is followed by a thicker outer spacer 70a. Outer torric magnets and spacers are then alternately placed in actuator cup 59. The thicknesses and other dimensions of the various spacers and magnets may vary according to the application needs and force requirements. The cup 59 is preferably formed of nonmagnetic lightweight material such as aluminum or various polymers such as PEEK, ULTEM, FRP, etc. The spacers are aligned such that the adjacent surfaces of two spaced magnets are of the same polarity. For example, the upper surface of magnet 72a as well as the lower surface of magnet 72b are the north poles of the respective magnets. Similarly, the adjacent faces of magnet 72b and 72c would be the south poles of the two magnets.

Similar to the outer magnetic element 74, the inner magnetic element 90 is assembled by stacking inner torric magnets 88 and inner spacers 86 alternately on the magnet mounting portion 82. When the magnet mounting portion 82 is threadably inserted into the needle tip portion 76, an inner thin spacer 81 is against the needle tip portion 76. Above this is inner torric magnet 88a. The spacers are aligned such that the adjacent surfaces of two spaced magnets are of the same polarity. For example, the upper surface of inner magnet 88a as well as the lower surface of inner magnet 88b are the south poles of the respective magnets. Similarly, the adjacent faces of inner magnet 88b and 88c would be the north poles of the two magnets.

The inner and outer magnetic elements 90, 74 mirror each other in that the dimensions and positions of the magnets and spacers are the same, only with the polarities reversed so that the elements 90, 74 mutually attract one another. As shown in FIG. 5, displacing the actuator 58 downward, and hence displacing its outer magnetic element 74 downward, creates a downward pull on the inner magnetic element 90 until inner magnetic element 90 is again aligned. As mentioned above, movement of outer magnetic element 74 may cause inner magnetic element 90 to be pulled along with it to or from an open or closed position as shown in FIGS. 2 and 3 or, conversely, movement of outer magnetic element 74 may push away, i.e., repel inner magnetic element to or from the open or closed position. This will simply depend on the positions of the magnetic poles, as will be understood by those of ordinary skill.

As shown best in FIG. 3, the body 12 generally includes the liquid passage 30. Liquid passage 30 extends into valve seat 14 around lower spring mechanism 42. Liquid passage 30 therefore allows liquid to flow into the valve seat 18 and ultimately to the dispensing orifice 80. A liquid entry port 92 leads to liquid passage 30 to allow introduction of liquid into body 12. The body 12 is shown operatively connected to a manifold 94 providing pressurized air to the air entry port 54 and the pressurized liquid to liquid entry port 92. Valve seat 14, which is connect to the body by bolts 100, is shown being threadably connected to a nozzle tip 96 having an outlet 98. Various types of nozzle tips may be employed to control the spray pattern of the liquid expelled from the orifice 80.

Referring to FIG. 2, operation of the liquid dispensing device 10 begins with the pressurized liquid being supplied by the manifold 94 through the liquid entry port 92 into the liquid passage 30. The manifold 94 also provides pressurized air through air entry port 54 into the actuator cavity 20 where the pressurized air impinges on an actuator 58, forcing the actuator 58 upward, as shown in FIG. 3. Within the actuator cup 59 of the actuator 58 is the outer annular magnetic element 74 which is magnetically coupled through the tubular member 34 to the valve stem 16. The valve stem 16 includes the inner annular magnetic element 90 that maintains alignment with the outer annular magnetic element 74. The valve stem 16 further includes the magnet mounting portion 82 that holds the inner annular magnetic element 90 to the needle tip portion 76 of the valve stem 16. As the valve stem 16 is drawn upward by the magnetically coupled actuator 58, the needle tip portion 76 of the valve stem 16 moves from the closed position to the open position, drawing away from the valve seat 14 and allowing the pressurized liquid to dispense through the dispensing orifice 80. Once the pressurized air is reduced or eliminated at the air entry port 54, the restoring force of the upper spring mechanism 65 acts pushing the actuator 58 downward, and hence the magnetically coupled valve stem 16 moves from the open position to the closed position.

Although the preferred embodiment utilizes the inner magnetic element 90 surrounded by the outer magnetic element 74, other geometries could be substituted. For example, the valve actuator may merely be adjacent to the valve stem but not encompass the valve stem. In this instance, the tubular member could be substituted with a barrier member shaped to allow the longitudinal travel of the actuator and valve stem. Also, the upper spring mechanism could be replaced by a pressurized cavity or may be positioned in the lower chamber of the actuator cavity biasing the valve to the open position rather than the closed position. In this latter case, air pressure may be used to close the valve rather than open the valve.

Although a specific description has been given for the preferred embodiment of this invention, those of ordinary skill in the art will readily recognize many modifications and substitutions that may be made in constructing the present invention without departing from the spirit or scope thereof. As only some examples in addition to those already given, the magnetic elements need not be shaped as shown in the preferred embodiment, and may be formed of any suitable magnetic material. In addition, the pneumatic and hydraulic sections of the body may be separated by a barrier extending transversely to the valve stem, as opposed to the barrier shown herein to extend parallel to the valve stem. Also, the valve stem in the preferred embodiment need not extend through the stacked magnets and spacers. For example, the magnets and spacers may be bonded to each other and suitably connected to the needle tip while also leaving an orifice for liquid to communicate with the inner, aligned openings of the annular magnets and spacers. Other various modifications may be made including the substitution of elements among the various embodiments. In summary, the scope of the invention entitled to patent protection is not meant to be limited to the details described herein but is intended only to be guided by the scope of the appended claims.

What is claimed is:

1. A device for dispensing a liquid comprising:
   (a) a dispenser body having an actuator cavity, a liquid passage and a valve seat positioned within said liquid passage;
   (b) a valve stem mounted for movement in said liquid passage and said actuator cavity between an open position and a closed position relative to said valve seat;
   (c) a first magnetic element connected to said valve stem and movable therewith;
   (d) a barrier between said actuator cavity and said valve stem, said barrier including a tubular member within said body, said tubular member encompassing a portion of said valve stem which is contained within said actuator cavity for preventing leakage of the liquid between said actuator cavity and said liquid passage;
   (e) an actuator mounted for movement within said actuator cavity and magnetically coupled to said first magnetic element, whereby movement of said actuator moves said first magnetic element and correspondingly moves said valve stem between said open position and said closed position; and
   (f) a lower spring mechanism and an upper cap operably connected to said body, said upper cap pushing said tubular member, the lower spring mechanism operably connected to said tubular member to yieldingly resist pushing of said tubular member by said upper cap.

2. The liquid dispensing device of claim 1, wherein said actuator further comprises a piston and said actuator cavity further comprises a pressurizable chamber receiving said piston for sliding movement therein.

3. The liquid dispensing device of claim 1, wherein said body further comprises a spring mechanism operably connected to said actuator to provide a restoring force to return said actuator to said closed position.

4. The liquid dispensing device of claim 1, wherein said barrier further comprises a static liquid seal between said tubular member and said body.

5. The liquid dispensing device of claim 1, wherein said first magnetic element further includes a plurality of first magnets which are alternately stacked with magnetically conductive spacers, and wherein said actuator further includes a plurality of second magnets which are alternately stacked with magnetically conductive spacers.

6. The device of claim 5, wherein said first and second magnets are annular rare earth magnets.

7. The device of claim 1, further comprising a valve stem plug adjustably defining a maximum open position of said valve stem.

8. The device of claim 1 further comprising a second magnetic element connected to said actuator and magnetically coupled to said first magnetic element.

9. A device for dispensing liquid comprising:
   (a) a dispenser body including a liquid passage and a constriction;
   (b) a valve seat disposed in said liquid passage and having a dispensing orifice communicating with said liquid passage;
   (c) an actuator cavity disposed in said body, said constriction disposed between said actuator cavity and said liquid passage;
   (d) a valve stem mounted for movement within said body between an open position and a closed position relative to said valve seat, said valve stem having a first magnetic element connected for movement therewith;
   (e) a tubular member contained within said body and sealed to said constriction;
   (f) an actuator mounted for movement within said actuator cavity, said actuator magnetically coupled to said first magnetic element and thereby operable to move the valve stem between said open position and said closed position; and
   (g) a lower spring mechanism and an upper cap operably connected to said body, said upper cap pushing said tubular member, said lower spring mechanism operably connected to said tubular member to yieldingly resist pushing of said tubular member by the upper cap.

10. The device of claim 9, wherein the actuator further comprises a piston and said actuator cavity further comprises a pressurizable chamber receiving said piston for sliding movement therein.

11. The device of claim 9, wherein said first magnetic element comprises an inner magnetic element encompassed by said tubular member, and wherein said actuator further comprises an outer magnetic element magnetically coupled to said inner magnetic element.

12. The device of claim 11, wherein said inner magnetic element includes a first inner magnet and a second inner magnet separated by a first magnetically conductive spacer, and wherein like magnetic poles of said first and second inner magnets face said first magnetically conductive spacer.

13. The device of claim 12, wherein said actuator includes an outer magnetic element, said outer magnetic element including a first outer magnet and a second outer magnet separated by a second magnetically conductive spacer, and wherein opposite magnetic poles of said first and second outer magnets face said second magnetically conductive spacer, the opposite magnetic poles of said first and second outer magnets being opposite to the opposite magnetic poles of said first and second inner magnets which face said first magnetically conductive spacer.

14. The device of claim 13, wherein said first and second inner magnetic elements and said first and second outer magnetic elements are annular rare earth magnets.

15. The device of claim 9, further comprising an annular static seal element disposed at the constriction and sealing against the tubular member.

16. The device of claim 15, wherein the annular static seal element is contained within a recess in the constriction.

17. A method for dispensing adhesive from a device including a body having an adhesive passage with a dispensing orifice, a valve seat communicating with said dispensing orifice, a valve stem mounted for movement between open and closed positions relative to said valve seat, and an actuator cavity including an actuator for moving said valve stem, the method comprising:
   (a) sealing said adhesive passage from said actuator cavity by encompassing a portion of said valve stem in a slidably engaged tubular member and engaging an outside surface of said tubular member with an annular static seal element;
   (b) engaging said tubular member with a yieldingly resisting member positioned between said tubular member and said body;

(c) magnetically coupling said valve stem to said actuator using at least one magnet; and (d) moving said actuator to thereby move the magnetically coupled valve stem to one of said open and closed positions.

18. The method of claim 17, wherein magnetically coupling the valve stem to said actuator further comprises connecting a first magnet to a portion of said valve stem and magnetically coupling said first magnet to a second magnet connected with said actuator.

19. The method of claim 17, wherein moving said actuator further comprises introducing pressurized air against a piston which forms part of said actuator.

20. The method of claim 17, wherein moving said actuator moves the magnetically coupled valve stem to said open position and the method further comprises:

moving said actuator in a second, opposite direction to thereby move the magnetically coupled valve stem in said second direction to said closed position.

21. A device for dispensing an adhesive comprising:

(a) a dispenser body having an actuator cavity, an adhesive passage and a valve seat positioned within said adhesive passage;

(b) a valve stem mounted for movement in said adhesive passage and said actuator cavity between an open position and a closed position relative to said valve seat;

(c) a first magnetic element connected to said valve stem and movable therewith;

(d) slidably mounted tubular member within said body, said tubular member encompassing a portion of said valve stem which is contained within said actuator cavity for preventing leakage of the adhesive between said actuator cavity and said adhesive passage;

(e) an actuator mounted for movement within said actuator cavity and magnetically coupled to said first magnetic element, whereby movement of said actuator moves said first magnetic element and correspondingly moves said valve stem between said open position and said closed position; and (f) a yieldingly resisting member operatively connected to said tubular member to yieldingly resist longitudinal displacement of said tubular member toward said adhesive passage.

\* \* \* \* \*

UNITED STATES PATENT AND TRADEMARK OFFICE
CERTIFICATE OF CORRECTION

PATENT NO. : 6,161,722
DATED : December 19, 2000
INVENTOR(S) : Sidney Niknezhad et al.

It is certified that error appears in the above-identified patent and that said Letters Patent is hereby corrected as shown below:

<u>Title page,</u>
Item [75], change "Sidney K. Sooudi" to -- Sidney Niknezhad --.

Signed and Sealed this

Thirtieth Day of October, 2001

Attest:

*Nicholas P. Godici*

NICHOLAS P. GODICI
*Attesting Officer*     *Acting Director of the United States Patent and Trademark Office*